United States Patent
Maekawa

(10) Patent No.: US 11,090,618 B1
(45) Date of Patent: Aug. 17, 2021

(54) TREATMENT METHOD OF FLUID TO BE TREATED BY ZEOLITE MEMBRANE

(71) Applicant: MITSUI E&S MACHINERY CO., LTD., Tokyo (JP)

(72) Inventor: Kazuya Maekawa, Tokyo (JP)

(73) Assignee: MITSUI E&S MACHINERY CO., LTD., Tokyo (JP)

( * ) Notice: Subject to any disclaimer, the term of this patent is extended or adjusted under 35 U.S.C. 154(b) by 0 days.

(21) Appl. No.: 17/055,823

(22) PCT Filed: Jul. 29, 2019

(86) PCT No.: PCT/JP2019/029591
§ 371 (c)(1),
(2) Date: Nov. 16, 2020

(87) PCT Pub. No.: WO2020/225931
PCT Pub. Date: Nov. 12, 2020

(30) Foreign Application Priority Data

May 9, 2019 (JP) .............................. JP2019-089007

(51) Int. Cl.
*B01D 71/02* (2006.01)
*B01D 61/36* (2006.01)
(Continued)

(52) U.S. Cl.
CPC ......... *B01D 71/028* (2013.01); *B01D 53/228* (2013.01); *B01D 53/50* (2013.01);
(Continued)

(58) Field of Classification Search
None
See application file for complete search history.

(56) References Cited

U.S. PATENT DOCUMENTS

| 2,924,630 A * | 2/1960 | Fleck .................. B01D 71/028 |
| | | 585/818 |
| 2007/0167530 A1 | 7/2007 | Gerlach et al. |

(Continued)

FOREIGN PATENT DOCUMENTS

| JP | 1997192650 A | 7/1997 | |
| JP | 2007-55970 | * 3/2007 | ............. B01D 61/36 |

(Continued)

OTHER PUBLICATIONS

Maekawa, Kazuya, "New Process of Membrane Dehydration Separation using Pretreatment System", Mitsui Engineering and Shipbuilding Technical Report, Jul. 2017, No. 219, 7 pages in Japanese. (Year: 2017).*

(Continued)

*Primary Examiner* — Jason M Greene
(74) *Attorney, Agent, or Firm* — Juan Carlos A. Marquez; Marquez IP Law Office, PLLC

(57) ABSTRACT

Provided is a method of efficiently treating a fluid to be treated containing a compound that destroys a zeolite membrane to prevent the fluid from destroying the zeolite membrane. A fluid to be treated 10 formed of a liquid mixture or a gas mixture and containing a compound that destroys a zeolite membrane 2 is brought into contact with particles (3, 5) made of the same type of zeolites as the zeolite membrane 2 and filling a pretreatment device 4 installed upstream of a membrane module 1 including the zeolite membrane 2 or a portion upstream of the zeolite membrane 2 in the membrane module 1 to destroy the zeolite forming the particles (3, 5) and the fluid to be treated 10 is made to contain a component generated by the destruction.

6 Claims, 2 Drawing Sheets

(51) Int. Cl.
    *B01D 53/22*     (2006.01)
    *B01D 53/50*     (2006.01)
    *B01D 53/72*     (2006.01)
    *B01D 67/00*     (2006.01)

(52) U.S. Cl.
    CPC ........... *B01D 53/72* (2013.01); *B01D 61/362* (2013.01); *B01D 67/0093* (2013.01)

(56) References Cited

U.S. PATENT DOCUMENTS

| | | |
|---|---|---|
| 2007/0284307 A1 | 12/2007 | Lin |
| 2014/0213830 A1 | 7/2014 | Sasaki et al. |
| 2017/0190640 A1* | 7/2017 | Noda ................... B01D 71/028 |

FOREIGN PATENT DOCUMENTS

| | | |
|---|---|---|
| JP | 2007055970 A | 3/2007 |
| JP | 2007-515448 A | 6/2007 |
| JP | 2007515448 A | 6/2007 |
| JP | 2012035163 A | 2/2012 |
| JP | 2016203078 A | 12/2016 |
| JP | 2018202413 A | 12/2018 |
| KR | 10-2007-0065355 A | 6/2007 |
| WO | 2012-018007 A1 | 2/2012 |
| WO | 2013035849 A | 3/2013 |

OTHER PUBLICATIONS

English language machine translation for JP 2007-55970. Retrieved from translationportal.epo.org on Jun. 15, 2021. (Year: 2021).*
English language machine translation for the publication "New Process of Membrane Dehydration Separation using Pretreatment System". Retrieved from translate.google.com on Jun. 14, 2021. (Year: 2021).*
Notice of Reasons for Refusal, Japan Patent Office, Applicaiton No. 2019-089007, dated Feb. 18, 2020; with English translation attached.
Notice of Reasons for Refusal, Japan Patent Office, Applicaiton No. 2019-089007, dated Sep. 17, 2019; with English translation attached.
"New Process of Membrane Dehydration Separation Using Pretreatment System," Kazuya Maekawa, Mitsui Engineering & Shipbuilding Technical Report, Jul. 2017, No. 219, 7 pages in Japanese.
"New Process of Membrane Dehydration Separation Using Pretreatment System," Kazuya Maekawa, Mitsui Engineering & Shipbuilding Technical Report, Jul. 2017, No. 219, 1 page English abstract.

* cited by examiner

US 11,090,618 B1

TREATMENT METHOD OF FLUID TO BE TREATED BY ZEOLITE MEMBRANE

TECHNICAL FIELD

The present invention relates to a treatment method of a fluid to be treated that increases the life of a zeolite membrane.

BACKGROUND ART

In recent years, a membrane separation method using a zeolite membrane with excellent heat resistance and chemical resistance has been actively adopted as a method of separating water from bioethanol containing impurities such as water to refine high-purity ethanol and as a method of separating and removing hazardous substances such as PCB from contaminated liquid. In a commercial plant using the membrane separation method, a membrane module formed by arranging many zeolite membranes formed in cylindrical shapes is used as a configuration unit of a membrane separation device and multiple membrane modules are connected in series to increase treatment performance (permeable flux) while maintaining selective permeation performance (permeation substance concentration) at an extremely high level. For such multiple membrane modules, there is a concern that when a substance to be treated such as, for example, bioethanol contains components such as organic acids and inorganic acids that destroy the zeolite membrane, such components hinder a membrane separation operation and destroy the zeolite membrane. The number of cylindrical zeolite membranes arranged in one membrane module is about 38 to 4000 and replacing many expensive zeolite membranes in a relatively short period leads to high cost and a large amount of labor and there is a concern of an increase in treatment cost of membrane separation. Accordingly, an operation of separating and removing the components that destroy the zeolite membrane from the substance to be treated by distillation or the like needs to be performed before the separation treatment using the membrane module. However, a unit operation such as distillation has such a problem that energy consumption is large and the operation cannot always sufficiently remove the components that destroy the zeolite membrane.

Patent Document 1 proposes a technique of increasing the life of a zeolite membrane by bringing a substance to be treated into contact with zeolite particles filling an inside of a pretreatment device independent of a membrane separation device before the substance to be treated is brought into contact with the zeolite membrane. However, there is a demand for a treatment method that performs the aforementioned pretreatment more efficiently with less energy to further improve membrane separation efficiency and further increase the life of the zeolite membrane.

PRIOR ART DOCUMENT

Patent Document

[Patent Document 1] Japanese Patent Application Publication No. 2012-35163

SUMMARY OF THE INVENTION

Problems to be Solved by the Invention

An object of the present invention is to provide a method of efficiently treating a fluid to be treated containing a compound that destroys a zeolite membrane to prevent destruction of the zeolite membrane.

Means for Solving the Problems

A treatment method of a fluid to be treated by a zeolite membrane in the present invention that achieves the aforementioned object is characterized in that the treatment method treats the fluid to be treated formed of a liquid mixture or a gas mixture and containing a compound that destroys the zeolite membrane, and the treatment method comprises: filling a pretreatment device installed upstream of a membrane module including the zeolite membrane or a portion upstream of the zeolite membrane in the membrane module with particles made of the same type of zeolite as the zeolite membrane; and bringing the fluid to be treated into contact with the particles to destroy the zeolite forming the particles and causing the fluid to be treated to contain a component generated by the destruction.

Effects of the Invention

In the treatment method of a fluid to be treated by a zeolite membrane in the present invention, the pretreatment device installed upstream of the membrane module or the portion upstream of the zeolite membrane in the membrane module is filled with the particles made of the same type of zeolite as the zeolite membrane and the fluid to be treated containing the compound that destroys the zeolite membrane is brought into contact with the particles to destroy the zeolite forming the particles and is made to contain the component generated by the destruction. Accordingly, the fluid to be treated can be efficiently treated without destroying the zeolite membrane.

The compound that destroys the zeolite membrane includes at least one selected from the group consisting of an organic acid, an inorganic acid, 3-methyl-1-butanol, acetal, dimethyl sulfide, and dimethyl sulfoxide, and the content thereof is preferably 2000 ppm or less.

When the fluid to be treated is a liquid mixture, contact time with the particles is preferably 60 to 600 seconds. When the fluid to be treated is a gas mixture, contact time with the particles is preferably 1 to 60 seconds.

MODES FOR CARRYING OUT THE INVENTION

Figure 1:
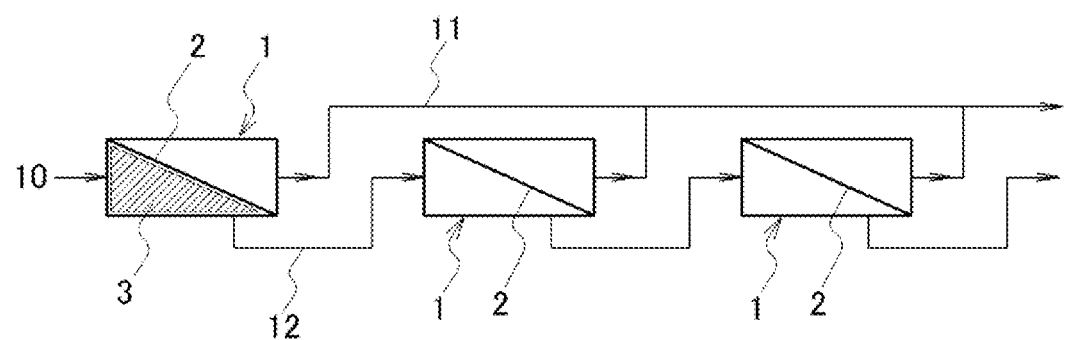
FIG. 1 is a schematic explanatory diagram illustrating an example of an embodiment of a treatment method in the present invention.

In a dehydration process of separating water from bioethanol containing impurities such as water, distillation and dehydration using a zeolite membrane are combined and this can improve dehydration efficiency while reducing energy required for the dehydration. Adjusting an ethanol concentration of the bioethanol in transition from a distillation step to a membrane separation step, that is, an impurity concentration, to a high level is advantageous in reduction of energy consumption. However, the impurities include components that destroy the zeolite membrane such as, for example, organic acids, inorganic acids, 3-methyl-1-butanol, acetal, dimethyl sulfide, and dimethyl sulfoxide. When the impurity concentration is adjusted to a high level, the zeolite membrane cannot perform the separation and there is a risk of the zeolite membrane being destroyed in a relatively short period. The treatment method of the present invention is a method of efficiently treating fluid to be treated by being subjected to membrane separation treatment using the zeolite membrane to prevent the fluid from destroying the zeolite membrane.

The fluid to be treated is formed of a liquid mixture or a gas mixture and contains a compound that destroys the zeolite membrane. Examples of the fluid to be treated include solutions such as bioethanol that are produced or by-produced in biomass industries, industrial organic waste liquids, solutions produced in chemical industrial processes and containing water, solutions of chemical reaction such as esterification reaction whose by-product is water, sea water, salt lake water, and the like. Furthermore, specific examples of the liquid mixture or the gas mixture include mixtures of water and alcohols such as methanol, ethanol, and isopropanol or carboxylic acids such as acetic acid, propionic acid, and butyric acid, mixtures of the aforementioned alcohols and ketones such as acetone and methyl ethyl ketone, halogenated hydrocarbon such as carbon tetrachloride and trichloroethylene, or organic solutions such as the aforementioned carboxylic acids, or mixtures of the aforementioned alcohols or carboxylic acids and aromatic compounds such as benzene and cyclohexane. Particularly, typical examples include dehydration separation of water-ethanol, water-propanol, water-acetic acid, water-methyl methacrylate, and the like.

Examples of compounds that destroy the zeolite membrane include organic acids, inorganic acids, 3-methyl-1-butanol, acetal, dimethyl sulfide, and dimethyl sulfoxide. The content of these impurities is preferably 2000 ppm or less, more preferably 10 to 1000 ppm in the fluid to be treated. Setting the content of impurities to 2000 ppm or less can further increase the life of the zeolite membrane in the membrane separation operation applying the treatment method of the present invention.

Moreover, when the water concentration in the fluid to be treated is high, water sometimes turns into a compound that destroys the zeolite membrane. When the water concentration in the fluid to be treated is, for example, 50% by weight or more, preferably 70% by weight or more, water has an effect of destroying the zeolite membrane. However, a membrane separation operation employing the treatment method of the present invention can increase the life of the zeolite membrane.

In the membrane separation method, the liquid mixture can be subjected to the membrane separation treatment by using a pervaporation method in which the liquid mixture is brought into contact with one side (supply side) of a separation membrane and depressurization is performed on the other side (permeation side) to vaporize and separate a specific liquid (permeable substance). Moreover, the gas mixture or the liquid mixture may be subjected to the membrane separation treatment by using a vapor permeation method in which the mixture is heated and supplied in a vapor state to be brought into contact with the separation membrane and depressurization is performed on the permeation side to separate a specific vapor.

In the treatment method of the present invention, the fluid to be treated formed of the liquid mixture or the gas mixture is brought into contact with particles made of the same type of zeolite as the zeolite membrane to destroy the zeolite forming the particles and a component generated by the destruction is contained in the fluid to be treated. Performing this treatment can prevent the fluid to be treated from destroying the zeolite membrane when the fluid comes into contact with the zeolite membrane.

Figure 2:
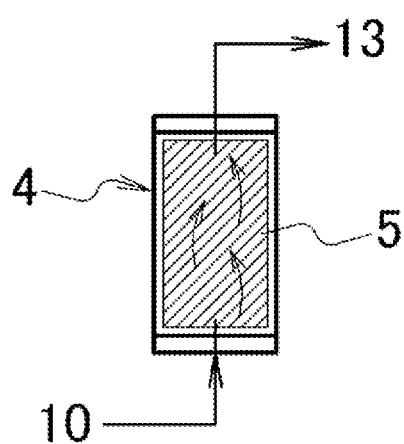
FIG. 2 is a schematic explanatory diagram illustrating an example of a pretreatment device used in the treatment method of the present invention.

FIGS. 1 and 2 are schematic explanatory diagrams illustrating an example of the embodiment of the treatment method in the present invention. In FIG. 1, three membrane modules 1 are connected in series from the upstream side to the downstream side. A fluid to be treated 10 is supplied to the most-upstream membrane module 1 and is brought into contact with a separation membrane 2. A permeating fluid 11 permeating the separation membrane 2 is transferred to permeating fluid collection means or a product tank (both are not illustrated). Moreover, a concentrated fluid 12 not permeating the separation membrane 2 is supplied to the downstream membrane module 1 and brought into contact with the separation membrane 2. The downstream membrane module 1 performs treatment of separating the supplied fluid into the permeating fluid 11 and the concentrated fluid 12 and the permeating fluid 11 and the concentrated fluid 12 are transferred to the permeating fluid collection means or the product tank and supplied to the further downstream membrane module 1, respectively, as described above.

In the embodiment, a layer 3 filled with particles made of the same type of zeolite as the zeolite membrane 2 is arranged upstream of the separation membrane 2 in the most-upstream membrane module 1. Although the zeolite membrane 2 is illustrated in a simplified manner as a diagonal line in FIG. 1, it is assumed that the zeolite membrane 2 has a cylindrical shape and the outside of the cylindrical zeolite membrane is filled with the zeolite particles to form the particle filled layer 3 when the fluid to be treated 10 is supplied to the outside of the cylindrical zeolite membrane and the permeating fluid 11 permeates into the cylindrical zeolite membrane. Causing the fluid to be treated 10 to pass through the particle filled layer 3 and come into contact with the zeolite particles destroys the zeolite forming the particles and the component generated by the destruction is contained in the fluid to be treated 10. Since the fluid to be treated 10 passing the particle filled layer 3 contains the component of destroyed zeolite, the fluid to be treated 10 does not destroy the zeolite when coming into contact with the zeolite membrane 2 and desired membrane separation treatment is performed. Moreover, the life of the zeolite membrane 2 can be increased.

FIG. 2 is a schematic explanatory diagram of a pretreatment device 4 installed upstream of the membrane module 1. A layer 5 filled with particles made of the same type of zeolite as the zeolite membrane 2 is arranged inside the pretreatment device 4. Causing the fluid to be treated 10 to pass through the particle filled layer 5 and come into contact with the zeolite particles destroys the zeolite forming the particles and the component generated by the destruction is contained in the fluid to be treated 10 and the fluid to be treated 10 is discharged as pretreated fluid 13. Since the pretreated fluid 13 passing the particle filled layer 5 contains the component of destroyed zeolite, the pretreated fluid 13 does not destroy the zeolite when coming into contact with the zeolite membrane 2 and desired membrane separation treatment is performed. Moreover, the life of the zeolite membrane 2 can be increased.

As described above, in the treatment method of the present invention, the fluid to be treated is made to destroy the zeolite particles and contain the destroyed component as it is. The fluid to be treated that comes into contact with the zeolite membrane thereby contains components in the same composition ratio as the components forming the zeolite membrane. An effect of the fluid to be treated damaging, breaking, or destroying the zeolite forming membrane can be thus made as small as possible when the fluid to be treated comes into contact with the zeolite membrane. Conventionally, there has been proposed a technique of suppressing ion exchange and dealumination of the zeolite forming the membrane by increasing the amount of cations that are the same as those contained in the zeolite membrane such as, for example, Nat, $K^+$, $Ca^{2+}$, $Ba^{2+}$, and $Mn^{2+}$ by ion exchange or addition of cation supplier to the fluid to be treated. Meanwhile, in the treatment method of the present invention, the fluid to be treated is made to destroy the zeolite particles and thereby contain silicon, aluminum, and cations forming the zeolite in the same composition ratio in a large amount. Accordingly, damage, breaking, or destruction of the zeolite membrane can be greatly suppressed when the fluid to be treated comes into contact with the zeolite membrane in a later step.

When the fluid to be treated is the liquid mixture, contact time of the liquid mixture and the zeolite particles is preferably 60 to 600 seconds, more preferably 60 to 300 seconds. Setting the contact time within such a range can prevent destruction of the zeolite membrane without a decrease in treatment efficiency of the fluid to be treated. The contact time of the liquid mixture and the zeolite particles can be adjusted by adjusting: one or all of the cross-sectional area of the layer filled with the particles, the height of this layer, and the diameter of the particles; the number of baffles provided substantially orthogonal to a direction of flow of the fluid to be treated in the particle filled layer; or the length of substantial flow passages in the particle filled layer.

When the fluid to be treated is the gas mixture, contact time of the gas mixture and the zeolite particles is preferably 1 to 60 seconds, more preferably 1 to 5 seconds. Setting the contact time within such a range can prevent destruction of the zeolite membrane without a decrease in the treatment efficiency of the fluid to be treated. The contact time of the solid mixture and the zeolite particles can be adjusted by adjusting: one or all of the cross-sectional area of the layer filled with the particles, the height of this layer, and the diameter of the particles; the number of baffles provided substantially orthogonal to a direction of flow of the fluid to be treated in the particle filled layer; or the length of substantial flow passages in the particle filled layer.

Examples of the present invention are described below. The examples do not limit the scope of the present invention.

EXAMPLES

Example 1

Preparation of Fluids to be Treated

As the fluid to be treated, ethanol and water were mixed at a weight ratio of 85/15 and each of compounds of formic acid, butyric acid, 3-methyl-1-butanol, dimethyl sulfide, and nitric acid was mixed into the mixture of ethanol and water as an impurity at an impurity concentration of 500 ppm. In addition to the fluids to be treated containing these impurities, a fluid to be treated containing no impurities was prepared for comparison.

Preparation of Pretreatment Device

Figure 3:
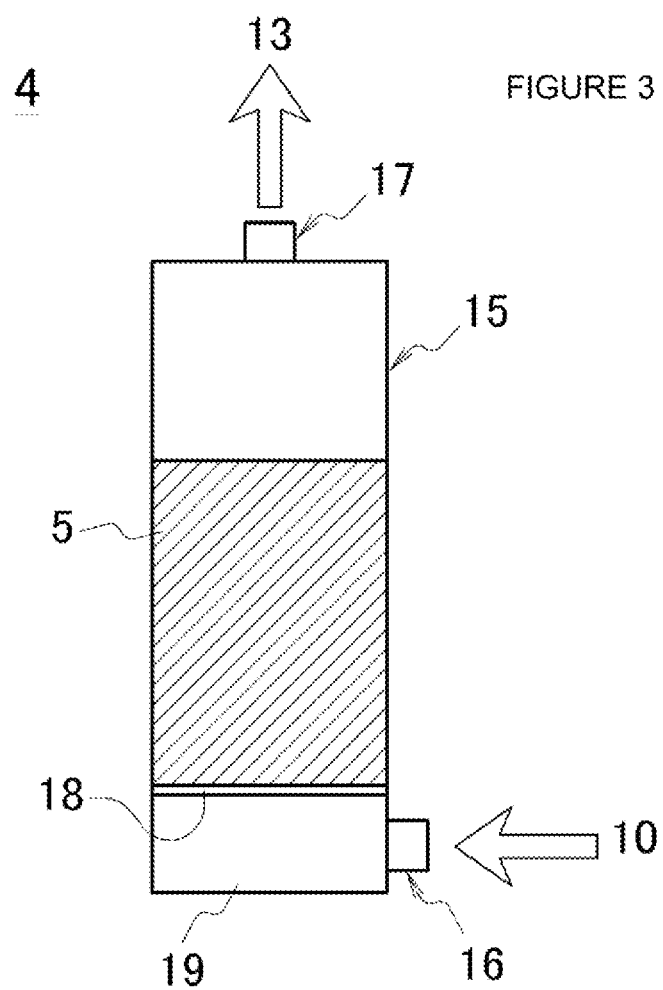
FIG. 3 is a schematic explanatory diagram of a pretreatment device used in Examples 1 and 2 of the present invention.

FIG. 3 schematically illustrates the pretreatment device 4. In FIG. 3, the pretreatment device 4 is formed of a container 15 having the particle filled layer 5 whose inside is filled with the zeolite particles. The pretreatment device 4 has a supply port 16 which is provided in a lower portion of the container 15 and through which the fluid to be treated 10 flows in and a discharge port 17 which is provided in an upper portion of the container 15 and through which the pretreated fluid 10 flows out. A partition plate 18 is arranged above the supply port 14 in the container 10 and the particle filled layer 5 made of zeolite particles is formed above the partition plate 18. Multiple small holes that allow only the fluid to be treated 10 to pass are opened in the partition plate 18. A buffer phase 19 for preventing entrance of the fluid to be treated 10 into the particle filled layer 5 in an uneven flow state is formed below the partition plate 18. The residence time of the fluid to be treated 10 can be adjusted by changing the height of the particle filled layer 5 (height from an upper surface of the partition plate 18 to an upper surface of the particle filled layer 5) and a supply flow rate of the fluid to be treated 10. The height of the particle filled layer 5 can be adjusted by adjusting the fill amount of the zeolite particles (granulated bodies containing NaA zeolite, product name A-4, produced by Tosoh Corporation, average particle size 6 mm). In the example, the residence time was set by combining the height of the particle filled layer 5 and the supply flow rate of the fluid to be treated 10 as illustrated in Table 1.

TABLE 1

| Fill height of particle filled layer | Supply flow rate of fluid to be treated (mL/min) | | | | |
| --- | --- | --- | --- | --- | --- |
| | 80 mL/min | 96 mL/min | 175 mL/min | 350 mL/min | 700 mL/min |
| 20 mm | 57 seconds | 52 seconds | 26 seconds | 12 seconds | 5 seconds |
| 130 mm | 371 seconds | 337 seconds | 168 seconds | 79 seconds | 34 seconds |

We prepared the fluid to be treated containing no impurities (ethanol/water in a weight ratio of 85/15, hereinafter sometimes referred to as "blank") and the fluids to be treated containing the impurities that were each obtained by mixing 500 ppm of one selected from formic acid, butyric acid, 3-methyl-1-butanol, dimethyl sulfide, and nitric acid as the impurity. These fluids were pretreated in various residence times, under the conditions of the supply flow rate and the particle filled layer height illustrated in Table 1. Specifically, each of the fluids to be treated was made to flow in from the supply port in the lower portion of the pretreatment device and the pretreated fluid discharged from the discharge port in the upper portion of the pretreatment device was collected. Only a solution directly discharged from the pretreatment device was collected as the collected pretreated fluid. The collected solution was evaluated by using an ICP (Inductively Coupled Plasma) analysis method to check presence of Na ions and the concentration thereof.

Measurement results of the Na ion concentrations in the fluids to be treated subjected to no pretreatment (residence time was 0 seconds) and the pretreated fluids (residence times were 5 to 371 seconds) passing the pretreatment device with the residence time varied are illustrated in Table 2 for the blank and the fluids to be treated containing the impurities. The Na ion concentrations in the case where the blank was pretreated were the lowest and the Na ion concentrations in the case where the fluids to be treated containing 3-methyl-1-butanol and DMS were pretreated were the lowest next to the pretreated blank. Meanwhile, the Na ion concentrations were high in the fluids containing acid substances of formic acid, nitric acid, and butyric acid as the impurities.

Since Na ions reached solubility equilibrium when the concentration thereof was about 1 ppm in the pretreatment of the blank, it can be assumed that this value is a solubility equilibrium value at which Na ions in a fluid to be treated with water concentration of 15% by weight can be emitted in a stable state without destroying fillers made of NaA zeolite particles. Meanwhile, it can be assumed that this solubility equilibrium is altered when there is a hydrocarbon compound of 3-methyl-1-butanol or DMS or an acid substance of formic acid, nitric acid, or butyric acid in the fluid to be treated. Specifically, the following two considerations can be made. First is assumption that the hydrocarbon compound or the acid substance destroys a zeolite structure in the NaA zeolite that is the material of the filler and the Na ions contained in the zeolite structure, which are not emitted in the pretreatment of the blank, are emitted and reach the solubility equilibrium. Second is assumption that electric charge in the water solution becomes uneven due to the hydrocarbon compound or the acid substance and the Na ions in the NaA zeolite, which do not dissolve in the pretreatment of the blank, dissolve to achieve equilibrium with respect to this unevenness and reach the equilibrium.

where an isopropanol/water mixture is dehydrated with the zeolite membrane as the fluid to be treated were demonstrated, assuming actual refinement and collection of isopropanol.

A fluid to be treated obtained from an isopropanol refinement collection plant was isopropanol/water in a weight ratio of 90/10 (% by weight) and contained 500 ppm oxalic acid as an impurity. The pretreatment was performed by using the same pretreatment device as that in Example 1 under the condition where the residence time was 337 seconds. The pretreated fluid subjected to the pretreatment and the fluid to be treated not subjected to the pretreatment were subjected to dehydration treatment with the zeolite membrane and the levels of the performance decrease in the zeolite membrane were compared.

The dehydration treatment was performed by a pervaporation method (PV method) using a NaA zeolite membrane with an effective membrane area of 14.5 cm$^2$. A batch dehydration method was performed at operation temperature of 110° C. by using a liquid nitrogen trap with the permeation side set to vacuum pressure of 6 Torr. A charge amount was set to 300 ml. The dehydration was started after the operation temperature reached 110° C. and the permeation amount (permeable flux) per unit time on the permeation side and the water concentration on the permeation side were measured every predetermined time. The zeolite membranes were prepared for the respective fluids and were continuously used without being replaced while the tests were repeatedly performed.

The test results of the dehydration treatment are illustrated in Table 3. Dehydration treatment for 300 ml of fluid to be treated was repeatedly performed four times without performing the pretreatment, and a dehydration test for 1200 ml of fluid was performed. As a result, the water concentration in the permeating liquid did not greatly change but the permeable flux gradually decreased and, in the fourth test, dropped to about half of that in the first test. Meanwhile, when the fluid to be treated was subjected to the pretreatment and then subjected to the dehydration treatment, the water concentration in the permeating liquid changed within a higher water concentration range than that in the case where the fluid to be treated was directly subjected to the dehydration treatment, and the permeable flux did not

| Residence time (second) | Type of impurity in fluid to be treated and Na ion concentration in pretreated fluid obtained by pretreating fluid to be treated | | | | | |
|---|---|---|---|---|---|---|
| | Blank | Formic acid | Butyric acid | 3-methyl-1-butanol | DMS | Nitric acid |
| 0 | 0.14 | <0.1 | <0.1 | <0.1 | <0.1 | <0.1 |
| 5 | 0.22 | 6.8 | 2.1 | 0.2 | 0.3 | 6.4 |
| 12 | 0.22 | 9 | 3.8 | 0.3 | 0.5 | 4 |
| 26 | 0.41 | 12 | 7.3 | 0.5 | 0.6 | 7.7 |
| 34 | 0.55 | 26 | 11 | 1.4 | 1.6 | 12 |
| 52 | 0.44 | — | 11 | — | — | — |
| 57 | 0.43 | — | 11 | — | — | — |
| 79 | 0.63 | 42 | 17 | 2.3 | 1.8 | 23 |
| 168 | 0.9 | 41 | 24 | 2.4 | 2.7 | 26 |
| 337 | 1.2 | 48 | 29 | 3 | 2.6 | 28 |
| 371 | 0.93 | — | 32 | — | — | — |

*Numerical values in the table indicate Na ion concentrations [ppm].
*Values for residence time of 0 seconds indicate Na ion concentrations in the fluids to be treated before supply to the pretreatment device.

Example 2

Effects of presence or absence of the pretreatment on a performance decrease of the zeolite membrane in the case change even after the dehydration treatment test was repeated five times for 1500 ml of fluid. Accordingly, we can assume that, when the treatment method of the fluid to be treated in the present invention was not performed, oxalic acid contained in the fluid to be treated adversely affected the zeolite membrane used for the dehydration treatment and the membrane performance (permeable flux) decreased.

kg/m² h. For the mixture that contained 35/65% by weight of isopropanol/water, the breakthrough time was about 17 hours and the permeating liquid flux was about 12.6 kg/m²

| | Fluid to be subjected to treatment (not subjected to pretreatment) | | | Pretreated fluid | | |
|---|---|---|---|---|---|---|
| Test number | Accumulated operation time [hour] | Total permeable flux (g/m²h) | Permeating liquid water concentration (% by weight) | Test number | Accumulated operation time [hour] | Total permeable flux (g/m²h) | Permeating liquid water concentration (% by weight) |
| First | 1 | 4612 | 97 | First | 1 | 4659 | 99.4 |
| | 2 | 2501 | 97 | | 2 | 2019 | 97.5 |
| | 4 | 815 | 94 | | 2.5 | 971 | 91.2 |
| Second | 5 | 3682 | 97 | Second | 3.5 | 4489 | 99.9 |
| | 6 | 2622 | 97.5 | | 4.5 | 1940 | 98.2 |
| | 8 | 1156 | 96 | | 5.0 | 958 | 95.7 |
| Third | 9 | 2823 | 96.5 | Third | 6.0 | 4681 | 99.4 |
| | 10 | 2476 | 97.3 | | 7.0 | 2158 | 98.4 |
| | 12 | 1479 | 96.2 | | 7.5 | 948 | 96.0 |
| | 13 | 476 | 92 | Fourth | 8.5 | 4722 | 99.9 |
| Fourth | 14 | 1950 | 96.5 | | 9.5 | 2124 | 98.5 |
| | 15 | 1997 | 97 | | 10.5 | 400 | 96.0 |
| | 17 | 1632 | 97 | Fifth | 11.5 | 4699 | 99.9 |
| | 19 | 624 | 94.5 | | 12.5 | 2109 | 98.5 |
| | | | | | 13.0 | 967 | 96.2 |

Example 3

This example demonstrates that high-concentration water contained in the fluid to be treated is a compound that destroys the zeolite membrane and the treatment method of the fluid to be treated in the present invention can suppress the performance decrease of the zeolite membrane.

Figure 4:
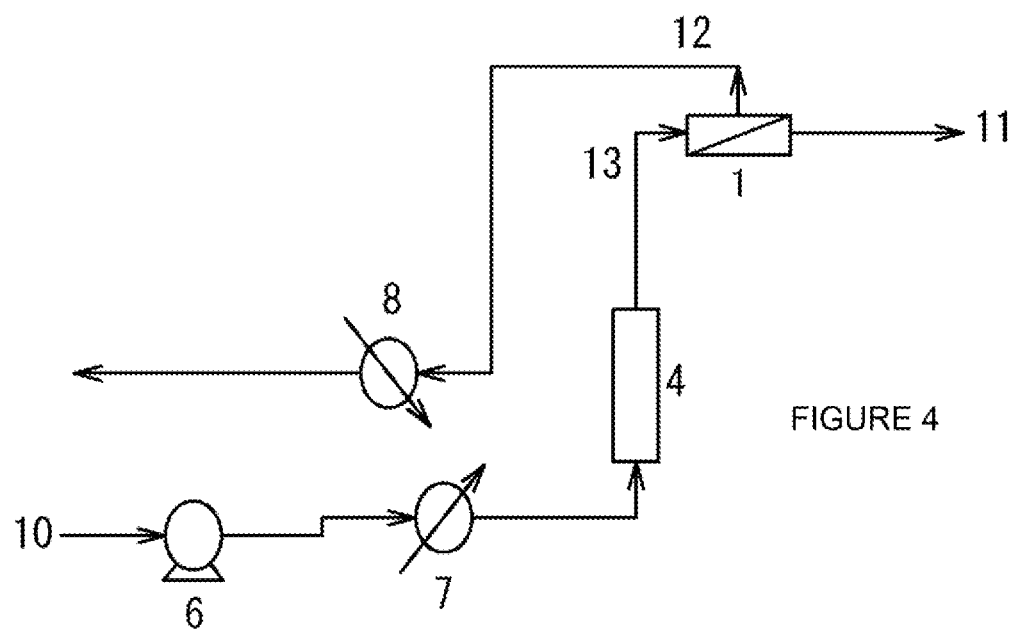
FIG. 4 is a schematic explanatory diagram of a dehydration system used in Example 3 of the present invention.

Two types of liquids of a mixture 1 that contained 10/90% by weight of isopropanol/water and a mixture 2 that contained 35/65% by weight of isopropanol/water were prepared as the fluids to be treated. These fluids to be treated were subjected to dehydration treatment by a flow-type pervaporation method (PV method) using a device whose outline is illustrated in FIG. 4. Operation temperature in the dehydration treatment was 110° C. and a liquid nitrogen trap with the permeation side set to 6 Torr was used. A pump 6 fed the fluid to be treated 10 into the pretreatment device 4, including a predetermined amount of NaA zeolite particles, via a heater 7 at a supply flow rate of 2.4 g/min and the pretreated fluid 13 passing the pretreatment device 4 directly flowed into the membrane module 1 formed of a NaA zeolite membrane (having an effective membrane area of 14.5 cm²). The concentrated fluid 12 not permeating the NaA zeolite membrane was cooled by a cooler 8 and entered a concentration tank (not illustrated).

Three types of pretreatment devices filled with 0 g, 0.5 g, and 1.0 g of NaA zeolite particles were prepared as the pretreatment devices and the dehydration treatment was performed in the aforementioned flow-type PV operation method. Continuous operation time required for the water concentration on the permeation side to reach or fall below 99.5% by weight was measured and set as breakthrough time to be used as a performance index of the zeolite membrane. The longer the breakthrough time is, the more the performance decrease of the zeolite membrane is suppressed.

When the mixture 1 that contained 10/90% by weight of isopropanol/water was made to pass the pretreatment device in which the fill amount of the NaA zeolite particles was 0 g, the breakthrough time for the dehydration treatment was about 3.3 hours and the permeating liquid flux was about 15 kg/m² h. It can be seen that the higher the concentration of water in the fluid to be treated is, the shorter the breakthrough time is, and the more likely the performance decrease of the zeolite membrane is to occur.

When the mixture 1 that contained 10/90% by weight of isopropanol/water was made to pass the pretreatment device in which the fill amount of the NaA zeolite particles was 0.5 g, the breakthrough time for the dehydration treatment was about 10 hours and the permeating liquid flux was about 15.3 kg/m² h. For the mixture 2 that contained 35/65% by weight of isopropanol/water, the breakthrough time was about 47 hours and the permeating liquid flux was about 11.1 kg/m² h. For both mixtures, the breakthrough time was about 2.7 times longer than that in the case where the mixtures were not brought into contact with the NaA zeolite particles, and the performance decrease of the zeolite membrane was suppressed.

When the mixture 1 that contained 10/90% by weight of isopropanol/water was made to pass the pretreatment device in which the fill amount of the NaA zeolite particles was 1.0 g, the breakthrough time for the dehydration treatment was about 9.5 hours and the permeating liquid flux was about 16.2 kg/m² h. For the mixture 2 that contained 35/65% by weight of isopropanol/water, the breakthrough time was about 75 hours and the permeating liquid flux was about 13.4 kg/m² h. For both mixtures, the breakthrough time was about 3 to 4.4 times longer than that in the case where the mixtures were not brought into contact with the NaA zeolite particles, and the performance decrease of the zeolite membrane was suppressed.

Example 4

In an isopropanol refinement collection system, a pretreatment device in which NaA zeolite particles were filled to height of 1 m was arranged upstream of a membrane module formed of a NaA zeolite membrane for a fluid to be treated containing isopropanol and water and was made to operate for about one year, that is about 8000 hours. The fluid to be treated contained approximately 90/10% by weight of isopropanol/water and contained about 500 ppm oxalic acid on average as an impurity. This fluid to be treated was vaporized by using a vaporizer and supplied to the pretreatment device in a vapor state at linear speed of 0.8 m/sec to perform the pretreatment.

After the pretreatment of the fluid to be treated was performed for about 8000 hours, we collected the NaA zeolite particles at depth of 0 cm (top portion), 20 cm, 40 cm, 60 cm, 80 cm, and 100 cm (bottom portion) from an upper portion of the particle filled layer of the pretreatment device. The collected zeolite particles and unused NaA zeolite particles were dried at 70° C. for 24 hours and then pulverized to be subjected to elemental analysis using an X-ray fluorescence elemental analysis device (EDX-720 manufactured by Shimadzu Corporation). Results of this measurement are illustrated in Table 4. Values in the table indicate % by weight of the components.

TABLE 4

| Component composition % by weight | Position where zeolite particles were collected | | | | | | |
|---|---|---|---|---|---|---|---|
| | Unused | Top portion | 20 cm | 40 cm | 60 cm | 80 cm | Bottom portion |
| $Na_2O$ | 16.9 | 12.8 | 12.9 | 12.7 | 11.6 | 11.3 | 10.6 |
| $Al_2O_3$ | 37.3 | 44.7 | 44.7 | 44.7 | 45.4 | 45.4 | 45.7 |
| $SiO_2$ | 44.5 | 41.6 | 41.5 | 41.6 | 42.0 | 42.3 | 42.7 |
| Others | 1.3 | 0.9 | 0.9 | 1.0 | 1.0 | 1.0 | 1.0 |
| Total | 100 | 100 | 100 | 100 | 100 | 100 | 100 |

The amount of Na (in terms of $Na_2O$ oxide) in the unused NaA zeolite particles was about 17% by weight while the amount of Na (in terms of $Na_2O$ oxide) in the NaA zeolite particles used in the pretreatment was about 11 to 13% by weight. The amount of Na decreased by about 35% at maximum and it is assumed that Na flowed out by destruction of the zeolite particles. Moreover, in the unused NaA zeolite particles, the $Al_2O_3$ component was about 37% by weight, the $SiO_2$ component was about 45% by weight, and the $Al_2O_3/SiO_2$ ratio was 0.84. Meanwhile, in the NaA zeolite particles used in the pretreatment, the $Al_2O_3$ component was about 45 to 46% by weight, the $SiO_2$ component was about 42 to 43% by weight, and the $Al_2O_3/SiO_2$ ratio was 1.07 to 1.08. Since the $Al_2O_3/SiO_2$ ratio changed as described above, it can be said that the structure of the zeolite particles changed due to contact with the fluid to be treated. Specifically, it is assumed that electrical charge balance in the zeolite structure was altered due to removable of Na ions from the zeolite structure and at least part of zeolite was destroyed.

EXPLANATION OF REFERENCE NUMERALS 1 membrane module
2 separation membrane
3 particle filled layer
4 pretreatment device
5 particle filled layer
10 fluid to be treated
11 permeating fluid
12 concentrated fluid
13 pretreated fluid

What is claimed is:

1. A treatment method of a fluid to be treated by a zeolite membrane, wherein the treatment method treats the fluid to be treated formed of a liquid mixture or a gas mixture and containing a compound that destroys the zeolite membrane, the treatment method comprising the steps of:
    filling a particle filled layer installed a portion upstream of the zeolite membrane in a membrane module including the zeolite membrane with particles made of the same type of zeolite as the zeolite membrane; and
    bringing the fluid to be treated into contact with the particles to destroy the zeolite forming the particles and causing the fluid to be treated to contain a component generated by the destruction.

2. The treatment method according to claim 1, wherein the compound that destroys the zeolite membrane is at least one of an organic acid and an inorganic acid, and the fluid to be treated contains 2000 ppm or less of the compound.

3. The treatment method according to claim 1, wherein the compound that destroys the zeolite membrane is at least one of 3-methyl-1-butanol and acetal, and the fluid to be treated contains 2000 ppm or less of the compound.

4. The treatment method according to claim 1, wherein the compound that destroys the zeolite membrane is at least one of dimethyl sulfide and dimethyl sulfoxide, and the fluid to be treated contains 2000 ppm or less of the compound.

5. The treatment method according to claim 1, wherein the fluid to be treated is a liquid mixture, and contact time with the particles is 60 to 600 seconds.

6. The treatment method according to claim 1, wherein the fluid to be treated is a gas mixture, and contact time with the particles is 1 to 60 seconds.

* * * * *